(12) United States Patent
Yasukawa et al.

(10) Patent No.: US 11,743,901 B2
(45) Date of Patent: Aug. 29, 2023

(54) USER EQUIPMENT AND COMMUNICATION METHOD

(71) Applicant: NTT DOCOMO, INC., Tokyo (JP)

(72) Inventors: Shinpei Yasukawa, Tokyo (JP); Satoshi Nagata, Tokyo (JP); Kazuaki Takeda, Tokyo (JP); Yousuke Sano, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/323,547

(22) PCT Filed: Aug. 7, 2017

(86) PCT No.: PCT/JP2017/028640
§ 371 (c)(1),
(2) Date: Feb. 6, 2019

(87) PCT Pub. No.: WO2018/030360
PCT Pub. Date: Feb. 15, 2018

(65) Prior Publication Data
US 2019/0166620 A1    May 30, 2019

(30) Foreign Application Priority Data

Aug. 10, 2016   (JP) ................................ 2016-158265

(51) Int. Cl.
| | |
|---|---|
| *H04W 72/14* | (2009.01) |
| *H04W 24/08* | (2009.01) |
| *H04W 72/04* | (2023.01) |
| *H04L 5/00* | (2006.01) |
| *H04W 88/02* | (2009.01) |
| *H04W 72/23* | (2023.01) |

(Continued)

(52) U.S. Cl.
CPC .......... *H04W 72/23* (2023.01); *H04L 5/0044* (2013.01); *H04W 24/08* (2013.01); *H04W 72/0446* (2013.01); *H04W 74/08* (2013.01); *H04W 88/02* (2013.01); *H04L 5/0048* (2013.01)

(58) Field of Classification Search
None
See application file for complete search history.

(56) References Cited

U.S. PATENT DOCUMENTS

| | | | |
|---|---|---|---|
| 11,412,535 B2 * | 8/2022 | Ye ......................... | H04L 5/0082 |
| 2014/0036889 A1 * | 2/2014 | Kim .................. | H04W 72/0446 370/336 |

(Continued)

OTHER PUBLICATIONS

International Search Report issued in PCT/JP2017/028640 dated Sep. 5, 2017 (4 pages).

(Continued)

*Primary Examiner* — Steve R Young
(74) *Attorney, Agent, or Firm* — Osha Bergman Watanabe & Burton LLP

(57) ABSTRACT

A user equipment in a radio communication system including a base station and the user equipment, the user equipment including: a resource management unit that retains configuration information of a resource capable of transmitting uplink data without receiving uplink data transmission permission from the base station; and a transmission unit that transmits a signal indicating that uplink data transmission using the resource is performed to the base station.

3 Claims, 15 Drawing Sheets

(51) Int. Cl.
H04W 74/08 (2009.01)
H04W 72/0446 (2023.01)

(56) References Cited

U.S. PATENT DOCUMENTS

| | | | | |
|---|---|---|---|---|
| 2016/0353436 | A1* | 12/2016 | Au | H04L 5/1469 |
| 2017/0332358 | A1* | 11/2017 | Park | H04W 72/1289 |
| 2017/0347378 | A1* | 11/2017 | Le-Ngoc | H04W 72/0446 |
| 2018/0035458 | A1* | 2/2018 | Islam | H04L 5/0096 |
| 2018/0041997 | A1* | 2/2018 | Babaei | H04W 52/325 |
| 2018/0199361 | A1* | 7/2018 | Zhang | H04W 74/00 |
| 2019/0215864 | A1* | 7/2019 | Yang | H04W 74/02 |
| 2019/0229843 | A1* | 7/2019 | Yoshimoto | H04L 1/0072 |
| 2019/0342061 | A1* | 11/2019 | Kim | H04W 52/281 |

OTHER PUBLICATIONS

Written Opinion of the International Searching Authority issued in PCT/JP2017/028640 dated Sep. 5, 2017 (3 pages).
3GPP TS 36.321 V13.2.0; "3rd Generation Partnership Project; Technical Specification Group Radio Access Network; Evolved Universal Terrestrial Radio Access (E-UTRA); Medium Access Control (MAC) protocol specification (Release 13)"; Jun. 2016 (91 pages).
Office Action in counterpart Japanese Patent Application No. 2018-533469 dated Sep. 7, 2021 (5 pages).
NTT Docomo, Inc.; "Uplink multiple access schemes for NR"; 3GPP TSG RAN WG1 Meeting #85, R1-165174; Nanjing, China; May 23-27, 2016 (6 pages).
Intel Corporation; "Uplink non-orthogonal multiple access for NR access technology"; 3GPP TSG RAN WG1 Meeting #85, R1-164178; Nanjing, P.R.O.C.; May 23-27, 2016 (9 pages).
Nokia Network; "Retuning Considerations for MTC"; 3GPP TSG-RAN WG1 Meeting #83, R1-156637; Anaheim, USA; Nov. 15-22, 2015 (5 pages).
Notice of Reasons for Refusal issued in Japanese Application No. 2018-533469 dated Jan. 11, 2022 (5 pages).
NTT Docomo, Inc, "Discussion on affinity for unlicensed spectrum access in 5G new radio" 3GPP TSG RAN WG1 Meeting #85, R1-165182, Nanjing, China, May 23-27, 2016 (4 pages).
Huawei, HiSilicon, "Consideration on grant free transmission for NR" 3GPP TSG-RAN WG2 Meeting #94, R2-164131, Nanjing, China May 23-27, 2016 (3 pages).

* cited by examiner

DATA SYMBOL

PREAMBLE OR REFERENCE SIGNAL

UPLINK CONTROL INFORMATION
FOR EXAMPLE SR (SCHEDULING REQUEST)

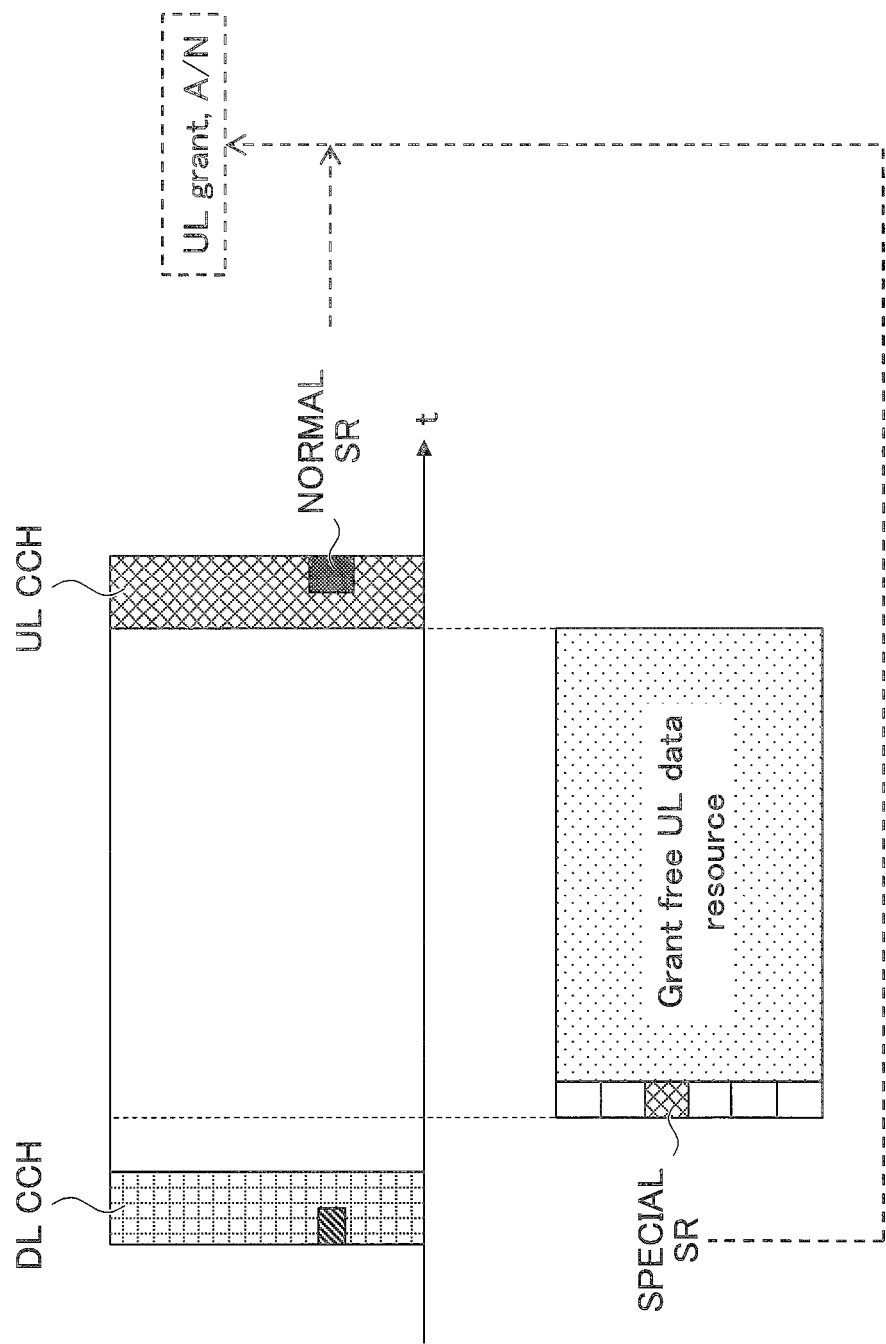

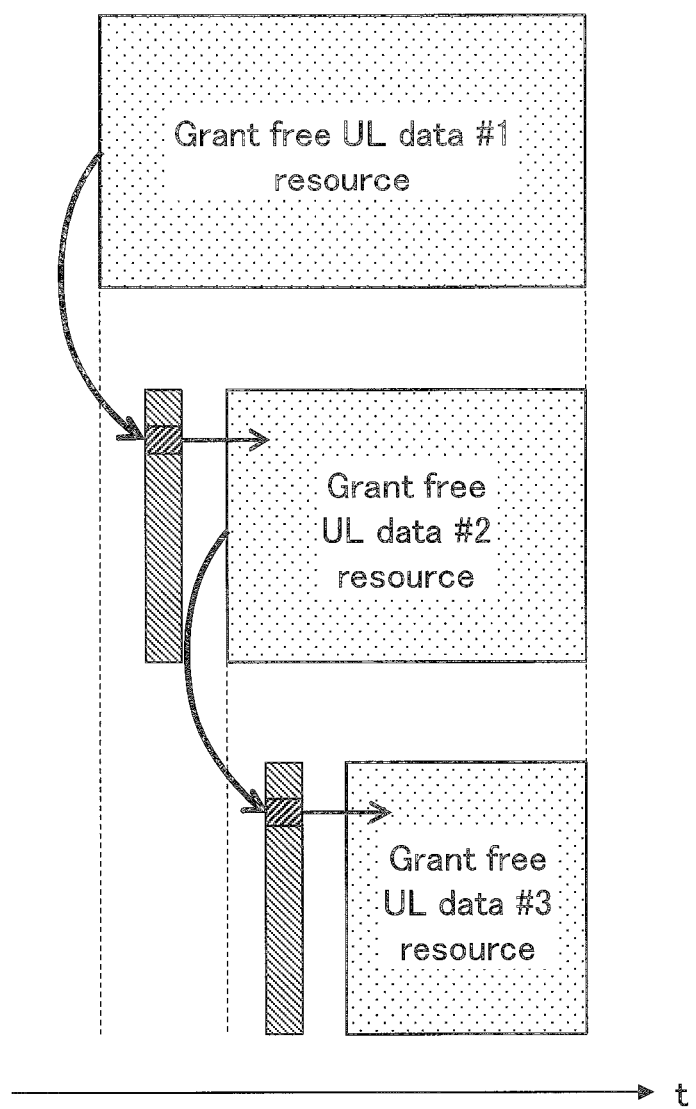

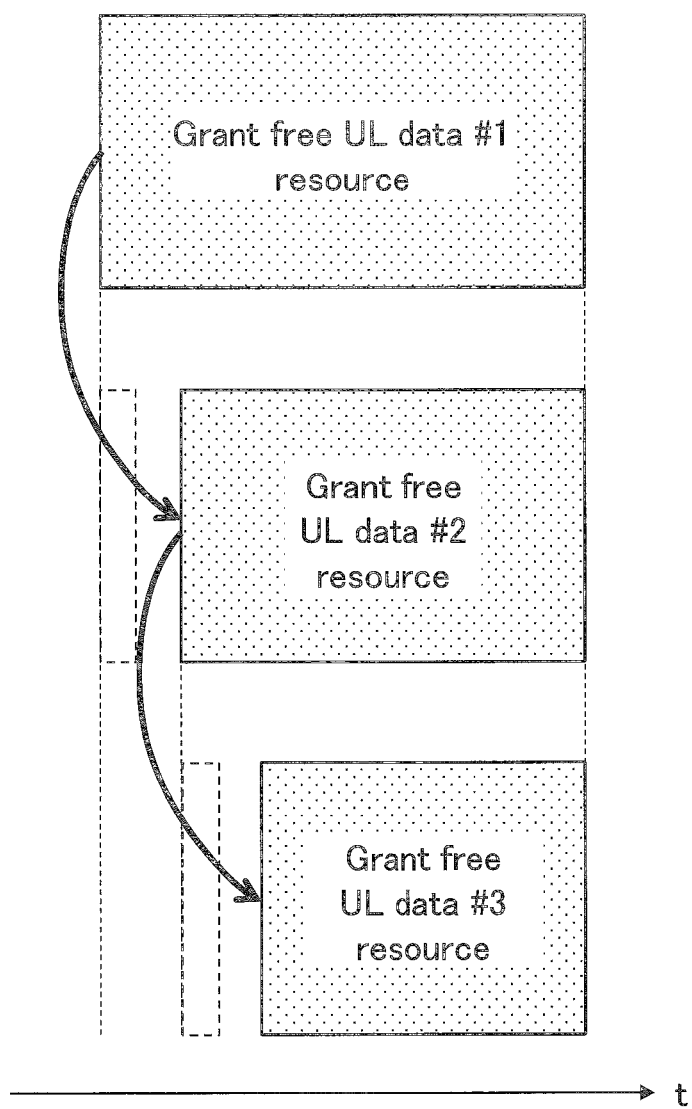

EXAMPLE 1

EXAMPLE 2

USER EQUIPMENT AND COMMUNICATION METHOD

TECHNICAL FIELD

The present invention relates to a user equipment in a radio communication system.

BACKGROUND ART

Currently, in a $3^{rd}$ generation partnership project (3 GPP), a next generation system, which corresponds to a successor of long term evolution (LTE)—advanced as one of fourth generation radio communication systems and is called 5G, has been examined. In the 5G, three use cases including an extended mobile broadband (eMBB), a massive machine type communication (mMTC), and an ultra reliability and low latency communication (URLLC) are mainly assumed.

The URLLC is aimed at realization of a radio communication with low latency and high reliability. In the URLLC, as a specific plan for realization of low latency, introduction of a short TTI length (also referred to as a subframe length, or a subframe interval), shortening of control latency from packet generation to data transmission, and the like have been examined. In addition, as a specific plan for realization of high reliability in the URLLC, introduction of a coding mode with a low coding rate and a modulation mode for realization of a low bit error rate, utilization of diversity, and the like have been examined.

In the URLLC, there is a possibility that transmission data with high emergency may suddenly occur, and thus it is necessary to transmit the data, which suddenly occurs, with low latency and high reliability.

In a case where data to be transmitted occurs in the user equipment, for example, in an uplink (UL) communication of the LTE, first, a scheduling request (SR) is transmitted to a base station, and the base station is requested to allocate a resource. The base station notifies the user equipment of the resource allocation as an UL grant (UL transmission permission), and the user equipment transmits data in a resource that is designated from the base station.

However, in the URLLC, as described above, there is a possibility that data to be transmitted may suddenly occur. Accordingly, in a case of performing data transmission based on the UL grant as described above, required conditions for low latency may not be satisfied.

Here, a grant free UL multiple access has been studied. The grant free UL multiple access enables the user equipment to perform UL data transmission without receiving the UL grant by allocating an UL resource, which is in common with a plurality of user equipments, in advance through higher layer signaling. Here, various methods such as a method using code spreading of each of the user equipments, and a method using interleave has been studied so that the base station can identify and separate data that is received from the plurality of user equipments. The grant free UL multiple access is one of effective ways from the viewpoint of low latency in UL data transmission.

CITATION LIST

Non-Patent Document

Non-Patent Document 1: 3 GPP TS 36.321 V13.2.0 (2016-06)

SUMMARY OF THE INVENTION

Problem to be Solved by the Invention

A resource, which is allocated to a plurality of user equipments for grant free UL transmission, is allocated in a semi-static manner through higher layer signaling, and does not reflect an instantaneous traffic. Accordingly, any of the user equipments may not perform UL transmission by using the resource (no transmission). Here, in a case where the grant free UL transmission is applied for a use with high reliability to be achieved similar to the URLLC, it is necessary to perform resource allocation in which a probability of no transmission is high so as to avoid error rate deterioration due to resource collision between the user equipments. However, there is a problem that resource utilization efficiency deteriorates due to occurrence of no transmission.

The invention has been made in consideration of the above-described circumstances, and an object thereof is to provide a technology capable of suppressing deterioration of resource utilization efficiency in a radio communication system in which configuration of a resource capable of transmitting uplink data without receiving uplink data transmission permission is performed.

Means for Solving Problem

According to a technology that is disclosed, there is provided a user equipment in a radio communication system including a base station and the user equipment, the user equipment including:

a resource management unit that retains configuration information of a resource capable of transmitting uplink data without receiving uplink data transmission permission from the base station; and a transmission unit that transmits a signal indicating that uplink data transmission using the resource is performed to the base station.

Effect of the Invention

According to the technology that is disclosed, it is possible to provide a technology capable of suppressing deterioration of resource utilization efficiency in a radio communication system in which configuration of a resource capable of transmitting uplink data without receiving uplink data transmission permission is performed.

BRIEF DESCRIPTION OF DRAWINGS

FIG. 6 is a view illustrating a detailed example of SR transmission;

FIG. 10A is a view illustrating an example of three-stage grant free UL multiple access, illustrating Example 1;

FIG. 10B is a view illustrating an example of three-stage grant free UL multiple access, illustrating Example 2;

MODE(S) FOR CARRYING OUT THE INVENTION

Hereinafter, an embodiment (this embodiment) of the invention will be described with reference to the accompanying drawings. Furthermore, the following embodiment to be described below is illustrative only, and an embodiment to which the invention is applied is not limited to the following embodiment.

It is assumed that a radio communication system of this embodiment supports at least an LTE communication mode. Accordingly, an existing technology defined in the LTE can be appropriately used in an operation of the radio communication system. However, the existing technology is not limited to the LTE. In addition, it is assumed that "LTE" in this specification has broad meaning including LTE-Advanced, and a mode (for example, 5G) subsequent to the LTE-Advanced unless otherwise stated. In addition, the invention is also applicable to a communication mode other than the LTE.

Whole Configuration of System

Figure 1:
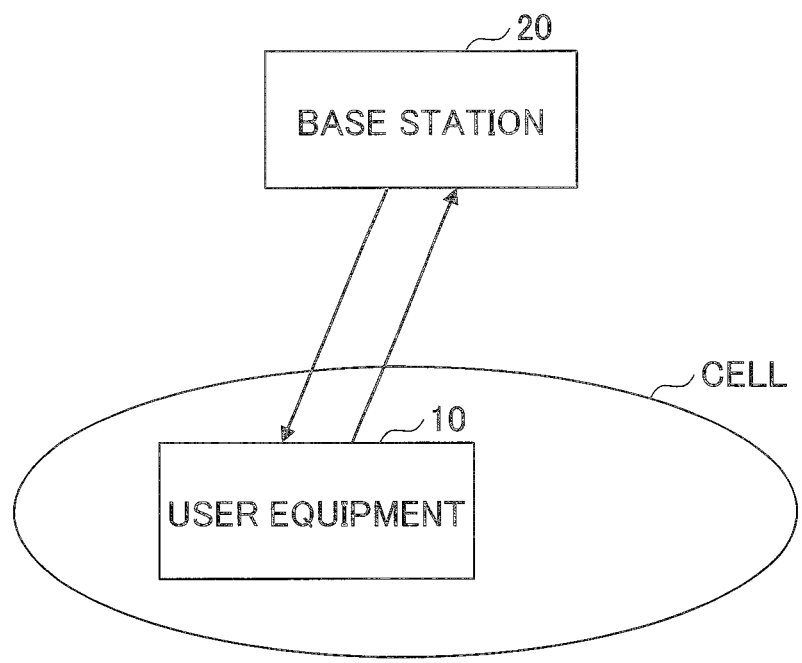
FIG. 1 is a configuration diagram of a radio communication system according to an embodiment of the invention.

FIG. 1 is a configuration diagram of a radio communication system according to this embodiment. As illustrated in FIG. 1, the radio communication system according to this embodiment includes a user equipment 10 and a base station 20. In FIG. 1, the user equipment 10 and the base station 20 are illustrated one by one, but this is illustrative only. A plurality of the user equipments 10 and a plurality of the base stations 20 may be respectively provided. In the following description, basically, in a case of describing an operation related to a certain user equipment, description will be made with a reference numeral similar to "user equipment 10", and description will be made without a reference numeral similar to "user equipment" in the other cases.

With Respect to Radio Frame Configuration

Description will be given of a radio frame that is used in the radio communication system according to this embodiment. Here, a configuration of a radio frame with a length of 1TTI will be described. Furthermore, a term of "radio frame" that is used in this specification and the appended claims represents a more general time unit instead of representing "radio frame" (10 msec) that is defined in current LTE. The radio frame with the length of 1TTI may be referred to as a subframe. In addition, for example, a time length of 1TTI may be 1 ms, 0.5 ms, and a length other than 1 ms and 0.5 ms.

The radio frame according to this embodiment employs time division duplex (TDD) as a duplex mode, and has a configuration capable of flexibly switching UL and DL in 1TTI as a basic configuration. According to this, ultra-low latency is realized. Furthermore, TDD is used as an example. In this embodiment, it is possible to use FDD that uses a frequency band that is different between UL and DL.

Figure 2:
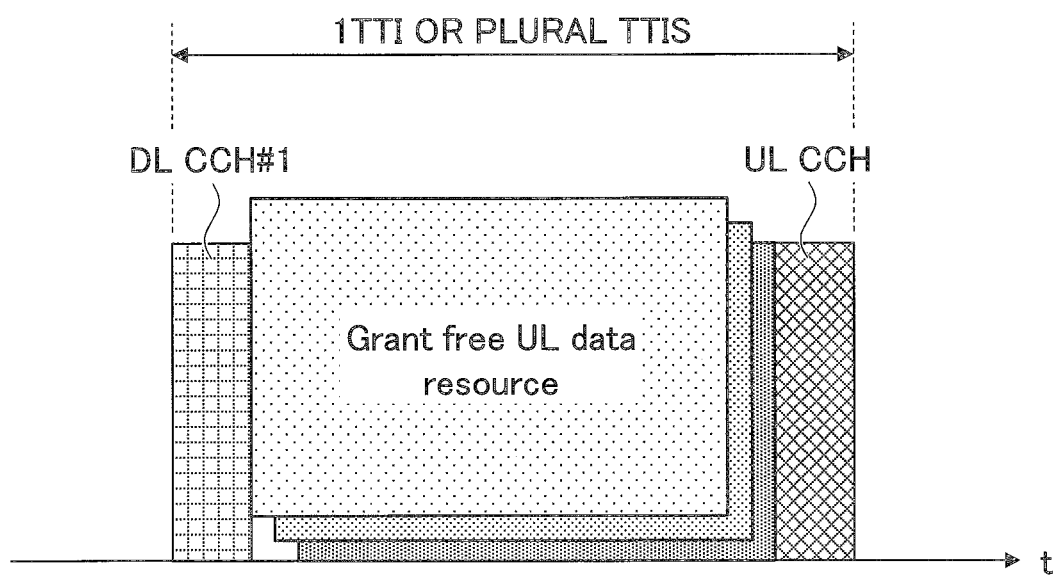
FIG. 2 is a view illustrating a radio frame configuration in the embodiment of the invention.

The radio communication system of this embodiment supports a grant free UL multiple access. FIG. 2 illustrates a radio frame configuration in a case where a grant free UL data resource region is set. As illustrated in FIG. 2, a downlink control channel (DL CCH)#1 that is a downlink control channel, and an uplink control channel (UL CCH) that is an uplink control channel are configured, and the grand free UL data resource region is set (configured) therebetween (in FIG. 2, a square that is described as "grant free UL resource"). In description in FIG. 2, the grant free UL data resource region is allocated to a plurality of users.

Note that, in the grant free UL data resource region, a resource that is used for uplink data transmission may be referred to as "grant free UL data resource".

For example, the grant free UL data resource region that is configured in the user equipment 10 is a resource pool. In this case, a user equipment in which the resource pool is configured may select a grant free UL data resource for data transmission from the resource pool to perform data transmission. In addition, the user equipment 10 can use the entirety of the grant free UL data resource region as a grant free UL data resource. In addition, a specific grant free UL data resource in the grant free UL data resource region may be allocated to the user equipment 10 from the base station 20. In this case, the user equipment 10 can perform UL data transmission by using the resource.

When considering that the grant free UL data resource region can be configured by the resource pool, as described above, the grant free UL data resource region may be a sidelink resource pool. In this case, the user equipment 10 can perform sidelink transmission by using the resource.

The DL CCH #1, the UL CCH, and the grant free UL data resource region are configured to the user equipment 10 from the base station 20, for example, by higher layer signaling or a broadcast signal (system information).

Furthermore, the configuration illustrated in FIG. 2 is illustrative only. For example, it is also possible to use a configuration including the grant free UL data resource region and the UL CCH without the DL CCH #1. In addition, it is also possible to use a configuration including the DL CCH #1 and the grant free UL data resource region without the UL CCH. In addition, it is also possible to use a configuration including only the grant free UL data resource region without the DL CCH #1 and the UL CCH.

Basic Operation Example

In this embodiment, in a case where the grant free UL data resource region is configured to any user equipment from the base station 20, if a user equipment that performs UL data transmission by the grant free UL data resource region does not exist, the grant free UL data resource region may be used (reused) as a resource region for UL data transmission/DL data reception based on scheduling, or a low-priority grant free UL data resource region.

The resource for UL data transmission/DL data reception based on scheduling is referred to as a grant based UL/DL data resource. In the following description, first, description will be given of a case where the grant free UL data resource region is reused as the grant based UL/DL data resource region, and then the low-priority grant free UL data resource region will be described as "multi-stage grant free UL multiple access".

Figure 3:
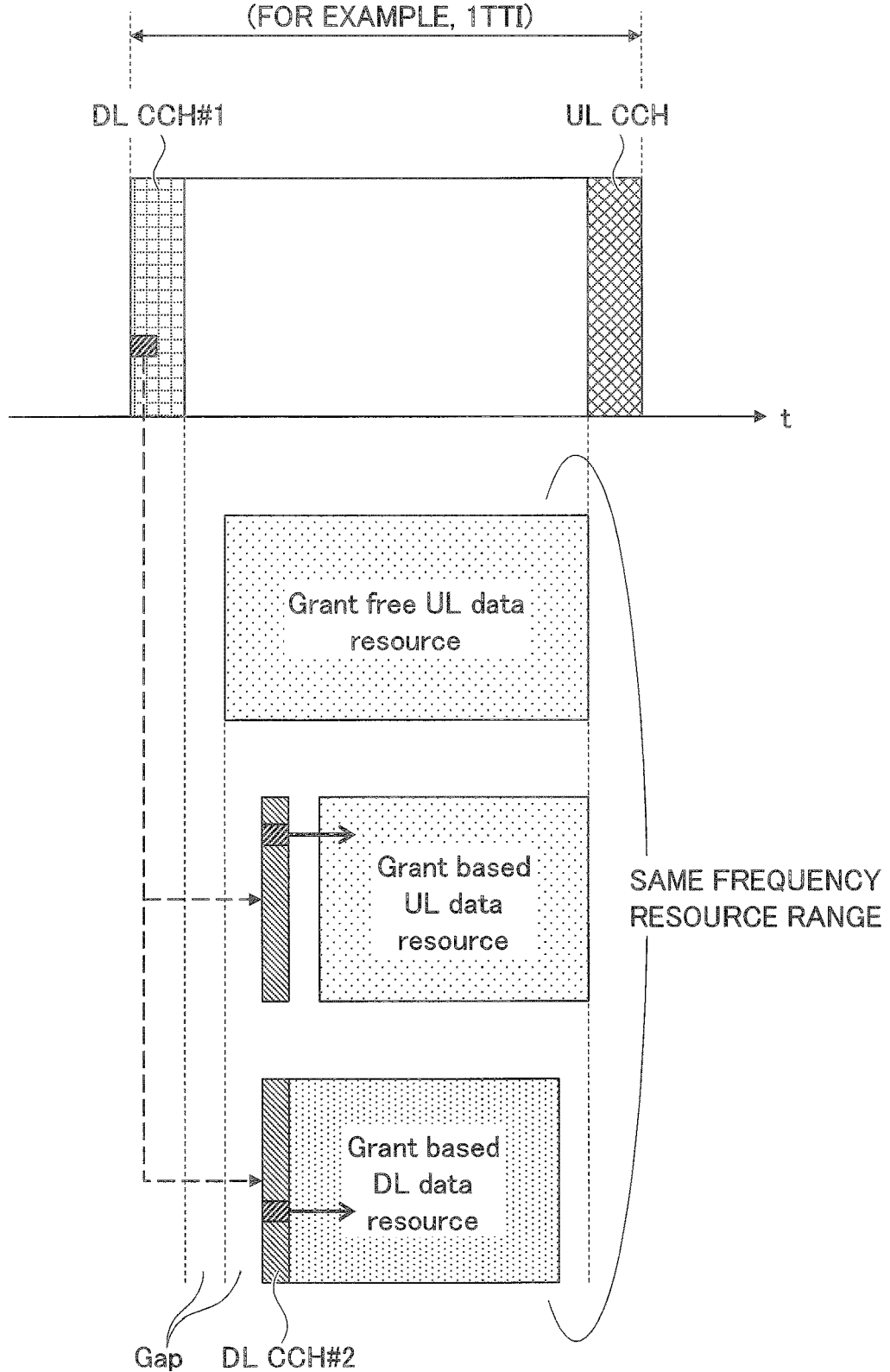
FIG. 3 is a view illustrating an overview of a resource using method in the embodiment of the invention.

FIG. 3 is a view illustrating an overview of a resource using method in a case where the grant free UL data resource region is reused as the grant based UL/DL data resource region.

As illustrated in FIG. 3, a second downlink control channel (DL CCH #2) is configured in the grant based UL/DL data resource region. For example, the user equipment 10 can receive allocation of a resource for UL data transmission/DL data reception in the grant based UL/DL data resource region by the DL CCH #2.

Note that, in FIG. 3, the grant free UL data resource region, the DL CCH #2+ the grant based UL data resource region, and the DL CCH #2+ the grant based DL data resource region are respectively illustrated for convenience. However, actually, any one of the three resource regions is located between the DL CCH #1 and the UL CCH.

As illustrated in FIG. 3, gap time (hereinafter, referred to as "gap") is provided between the DL CCH #1 and the grant free UL data resource region. The gap time is a gap for switching between DL and UL, and/or a transmission timing control. In addition, a gap is also provided between a leading portion of the grant free UL data resource region and the DL CCH #2. As to be described later, the base station 20 can perform an operation of detecting presence or absence of grant free UL transmission by using the gap between the leading portion of the grant free UL data resource region and the DL CCH #2. In a case where the grant free UL transmission is not present, control information (for example, downlink control information (DCI)) for scheduling can be transmitted with the DL CCH #2.

In addition, the base station 20 can detect presence or absence of sidelink transmission by using a resource pool that is a resource region capable of performing transmission in terminal-to-terminal (sidelink) communication instead of the grant free UL data resource region, or by setting a sidelink resource pool in a region in which the grant free UL data resource region and a time and frequency resource overlap each other. In a case where transmission is not present, control information for scheduling can be transmitted with the DL CCH #2.

In the DL CCH #2, scheduling of sidelink resource allocation may be performed, or availability of transmission in a sidelink resource pool, which is mapped to a symbol in the same TTI as in the DL CCH #2 and temporally after the DL CCH #2, may be notified.

In addition, for example, the base station 20 can control a monitoring operation for the DL CCH #2 with the user equipment 10 by transmitting control information with the DL CCH #1. For example, the user equipment 10 can transmit a HARQ feedback by using an UL CCH when performing grant based DL data reception.

As illustrated in FIG. 3, a period from initiation time of the DL CCH #1 to termination time of the UL CCH is determined as a transmission time unit of grant free UL data. The transmission time unit may be 1TTI, or plural TTIs. However, in this embodiment, the transmission time unit is 1TTI. An example of an operation at 1TTI is as follows.

When confirming that control information instructing monitoring of the DL CCH #2 is not received from the base station 20 with the DL CCH #1, the user equipment 10, in which the grant free UL data resource region is configured, determines that the grant free UL data resource can be used. In addition, the user equipment 10 performs UL data transmission by using the grant free UL data resource.

In addition, for example, when receiving the control information, which instructs monitoring of the DL CCH #2, from the base station 20 with the DL CCH #1, the user equipment 10 in which the grant free UL data resource region is configured determines to monitor the DL CCH #2. When receiving control information that allocates a resource for DL data reception with the DL CCH #2, the user equipment 10 receives data from the base station 20 by using a resource that is allocated in the grant based DL data resource region. Note that, the entirety of the grant based DL data resource region may be allocated to the user equipment 10.

Then, the user equipment 10 transmits a HARQ feedback (ACK/NACK) to the base station 20 by using the UL CCH.

In addition, for example, when receiving control information, which instructs monitoring of the DL CCH #2, from the base station 20 with the DL CCH #1, the user equipment 10, to which the grant free UL data resource region is configured, determines to monitor the DL CCH #2. When receiving control information that allocates a resource for UL data transmission with the DL CCH #2, the user equipment 10 transmits data to the base station 20 by using a resource that is allocated in the grant based UL data resource region.

With Respect to First and Second Control Channels

As described above, the base station 20 can control a monitoring operation for the DL CCH #2 in the user equipment 10 by using the DL CCH #1.

Figure 4A:
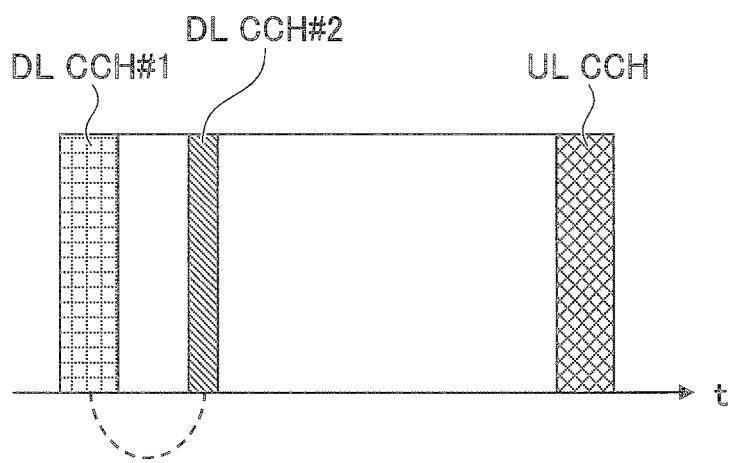
FIG. 4A is a view illustrating Configuration Example 1 of a second downlink control CH.
Figure 4B:
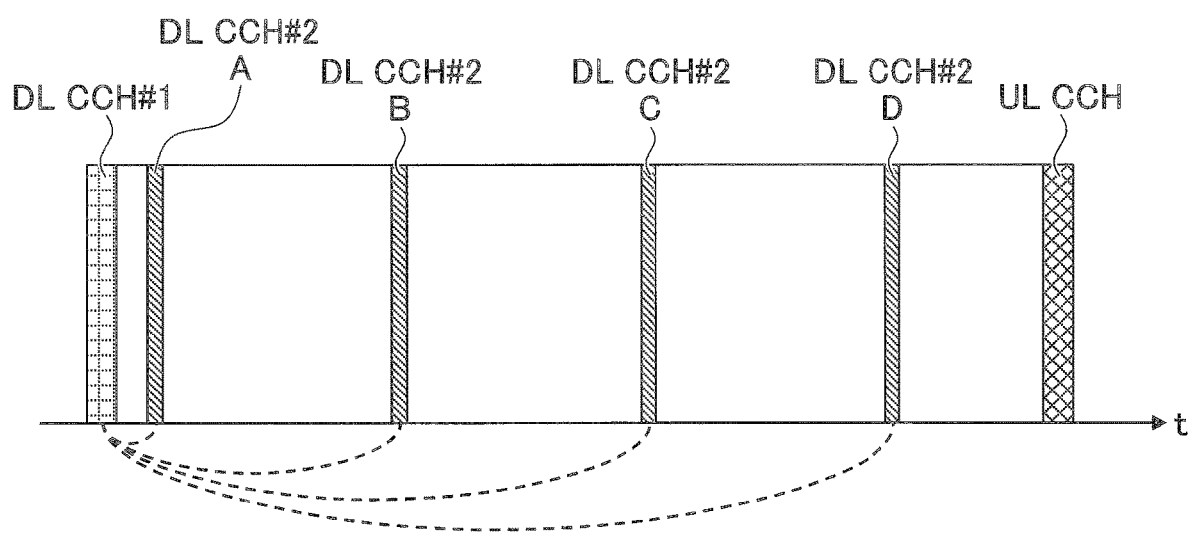
FIG. 4B is a view illustrating Configuration Example 2 of the second downlink control CH.

Here, a correspondence relationship between the DL CCH #1 and the DL CCH #2 may be one to one as illustrated in FIG. 4A (Configuration Example 1), or one to N (N is an integer greater than 1) as illustrated in FIG. 4B (Configuration Example 1). In FIG. 4B, four DL CCHs #2 are illustrated as A, B, C, and D.

In an example of FIG. 4B, instruction instructing the user equipment 10 which DL CCH #2 to monitor among A, B, C, and D, is given to the user equipment 10 from the base station 20 by using the DL CCH #1. For example, when being instructed to monitor the DL CCH #2 indicated by A from the base station 20 with the DL CCH #1, the user equipment 10 monitors the DL CCH #2 indicated by A. In addition, for example, when receiving allocation of a DL data resource in a resource region between A and B with the DL CCH #2 indicated by A, the user equipment 10 performs DL data reception with the resource. According to this configuration, it is possible to flexibly perform a monitoring control for a control channel.

Details of Monitoring Operation for Second Control Channel

Hereinafter, the monitoring operation for the DL CCH #2 in the user equipment 10 will be described in more detail.

In this embodiment, as is the case with PDCCH in LTE, for example, in the DL CCH #2, a UE common search region (UE common search space) that is a resource region in which a plurality of user equipments commonly perform monitoring (searching), and a UE specific search region (UE specific search space) that is a resource region in which each of the user equipment individually performs monitoring are present.

In addition, the user equipment 10 monitors only the UE specific search region in the DL CCH #2. That is, in this case, the base station 20 maps control information of the user equipment 10 to only the UE specific search region of the user equipment 10. According to this, a search range becomes narrow, and thus low latency processing is possible. Note that, this configuration is illustrative only, and the user equipment 10 may monitor both the UE common search region and the UE specific search region.

In addition, as an example, the user equipment 10 monitors the DL CCH #2 only in a case where the user equipment 10 is instructed to monitor the DL CCH #2 from the base station 20. The instruction from the base station 20 may be given by using the DL CCH #1 as described above with reference to FIG. 3. In the monitoring instruction for the DL CCH #2 which is given with the DL CCH #1, the base station 20 may give an instruction to monitor a DL CCH #2 in a TTI in which the DL CCH #1 that is used for the instruction is present, or may give an instruction to monitor a DL CCH #2 in a TTI different from the TTI in which the DL CCH #1 that is used for the instruction is present. For example, the latter example corresponds to a case where the base station 20 instructs the user equipment 10 to monitor a DL CCH #2 in a TTI3, which is a TTI that is a second subsequent to the TTI1, by using the DL CCH #1 in the TTI1.

In addition, the following control can be performed. Specifically, it is assumed that the grant free UL data resource region is configured in the user equipment 10. In addition, for example, the user equipment 10 reports buffer status information, which indicates that a transmission buffer size is not zero, to the base station 20 in TTIn-1 immediately previous to a certain TTIn (n indicates a TTI number and is an integer of 0 or greater). In this case, the base station 20 does not instruct any user equipment, in which the grant free UL data resource region is configure, to monitor the DL CCH #2 with the DL CCH #1 of TTIn. In this case, the user equipment 10 can perform transmission of UL data in a buffer by using the grant free UL data resource region.

In addition, for example, in a case where the entirety of a plurality of user equipments in which the grant free UL data resource is allocated do not report buffer state information, which indicates that a transmission buffer size in TTIn-1 is not zero, to the base station 20 (including reporting information indicating that the transmission buffer size is zero), the base station 20 instructs, for example, the user equipment 10, which is a scheduling target in which DL data is present, to monitor the DL CCH #2 with the DL CCH #1 in the TTIn, performs resource allocation to the user equipment 10 with the DL CCH #2, and performs DL data transmission.

Note that, the base station 20 may instruct the user equipment 10 to monitor the DL CCH #2 with higher layer signaling instead of the DL CCH #1.

As described above, only a user equipment that is a scheduling target is instructed to monitor the DL CCH #2, so that it is possible to suppress complexity of the user equipment and battery consumption.

Note that, in the above-described example, a monitoring operation control for the DL CCH #2 is performed by a monitoring instruction that is given to the user equipment from the base station 20, but the monitoring operation control for the DL CCH #2 can be performed without giving the monitoring instruction from the base station 20 to the user equipment.

For example, a user equipment, in which a grant free UL data resource region is configured in a TTI, may not always perform monitoring of the DL CCH #2 in the TTI. Alternatively, a user equipment, in which the grant free UL data resource region is set in a certain TTI, may not perform monitoring of the DL CCH #2 in a case of performing UL data transmission in the TTI, and may perform monitoring of the DL CCH #2 in a case of not performing the UL data transmission in the TTI. According to this operation, it is possible to avoid a situation in which transmission of grant free UL data is stopped due to the operation of monitoring the DL CCH #2 in the user equipment.

Operation of Detecting Presence or Absence of Grant Free UL Transmission by Base Station 20

As described above, basically, in a case where UL data transmission using the grant free UL data resource is performed by any one user equipment, the base station 20 does not perform scheduling of grant based UL/DL using the DL CCH #2. On the other hand, in a case where no user equipment perform UL data transmission using the grant free UL data resource, the base station 20 can perform scheduling of grant based UL/DL using the DL CCH #2 in the grant free UL data resource region.

To execute the above-described operation, it is necessary for the base station 20 to determine whether or not UL data transmission using the grant free UL data resource (referred to as "grant free UL transmission") is performed by the user equipment. An operation example of the determination will now be described.

In this embodiment, for example, the user equipment 10, to which the grant free UL data resource region is allocated, transmits an identification signal indicating presence or absence of grant free UL transmission with a symbol (in this embodiment, the symbol is an OFDM symbol, but a communication scheme is not limited to the OFDM) in a leading portion of the grant free UL data resource region. The number of symbol(s) for identification signal transmission may be 1 or a number of greater than 1. Note that, time of the leading portion corresponds to the gap between the leading portion of the grant free UL data resource region and the DL CCH #2 as illustrated in FIG. 3.

Figure 5A:
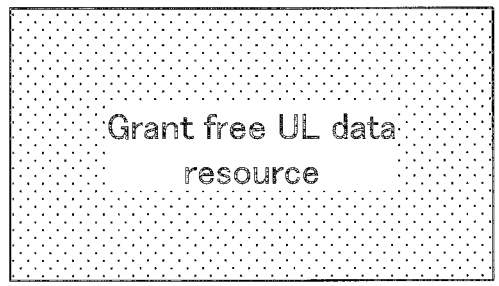
FIG. 5A is a view illustrating an example of an identification signal.
Figure 5B:
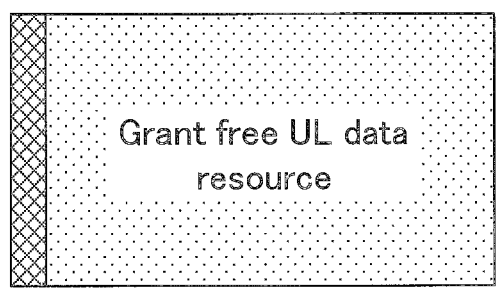
FIG. 5B is a view illustrating an example of an identification signal.
Figure 5C:
FIG. 5C is a view illustrating an example of an identification signal.

FIG. 5A-5C illustrate an example of an identification signal. FIG. 5A illustrates a grant free UL data resource region in a case where the identification symbol is not transmitted for comparison with other configurations. FIG. 5B illustrates a case where a preamble or a reference signal is used as the identification signal. In an example illustrated in FIG. 5B, the preamble or the reference signal is mapped to the entirety of a frequency region in the grant free UL data resource region. FIG. 5C illustrates a case where uplink control information (for example, scheduling request (SR)) is used as the identification signal. In the example illustrated in FIG. 5B, the uplink control information is mapped to a partial frequency region in the grant free UL data resource region.

For example, the user equipment 10 transmits the identification signal in a case of performing grant free UL transmission, and does not transmit the identification signal in a case of not performing the grant free UL transmission. In contrary, the user equipment 10 may transmit the identification signal in a case of not performing the grant free UL transmission, and may not transmit the identification signal in a case of performing the grant free UL transmission. In addition, the user equipment 10 may also transmit an identification signal that includes information indicating whether or not to perform the grant free UL transmission.

In addition, the base station 20 can identify a user equipment 10 that is a target by time and frequency resource position and/or the sequence of the identification signal (the preamble, the reference signal, or the uplink control information) that is received from the user equipment 10. Accordingly, for example, the base station 20 notifies the user equipment 10 of the time and frequency resource position and/or the sequence of the identification signal that is used by the user equipment 10 through higher layer signaling. In addition, the time and frequency resource position and/or the sequence of the identification signal may be implicitly configured instead of explicit notification as described above. The implicit configuration can be performed with information that is shared by the base station 20 and the user equipment 10. As an example, the identification information of the user equipment 10 is associated with the time and frequency resource position and/or sequence, and the user equipment 10 transmits the identification signal by using the time and frequency resource position and/or sequence that corresponds to the identification information of the user equipment 10.

In addition, transmission power, which is used by the user equipment 10 to transmit the identification signal, may be different from transmission power for data transmission. For example, the identification signal may be transmitted with transmission power that is greater than the transmission power for data transmission so as to enhance reliability. Specifically, for example, the user equipment 10 may transmit identification signal by applying transmission power of a reference signal and/or an uplink control channel.

Details in Case of Transmitting SR as Identification Signal

Hereinafter, description will be given of a detailed operation example in a case where the user equipment 10 transmits SR as the identification signal as illustrated in FIG. 5C. Note that, here, description is made with reference to SR as an example, but the following description is also suitable to a case of using another signal having the same effect as in SR as the identification signal.

In this embodiment, SR, which is transmitted by the user equipment 10 at a leading portion of the grant free UL data resource region, may be special SR different from SR (referred to as normal SR) that is defined in current 3 GPP standards. For example, the user equipment 10 may transmit the SR by using only one symbol. Hereinafter, SR, which is transmitted by the user equipment 10 at the leading portion of the grant free UL data resource region, is referred to as special SR.

As described above, as a method of transmitting the identification signal, various methods exist. However, here, it is assumed that the user equipment 10 transmits the special SR that is the identification signal in a case of performing grant free UL transmission and the user equipment 10 does not transmit the special SR in a case of not performing the grant free UL transmission.

The normal SR is not triggered when an UL resource is present even in a case where UL data is present in the user equipment 10 at a certain TTI (Non-Patent Document 1). On the other hand, the special SR in this embodiment is transmitted in a case where the UL data is present in the user equipment UE and the grant free UL data resource is present at the TTI.

In addition, when the normal SR is once transmitted, an SR transmission prohibition timer starts, and retransmission of the normal SR is not performed while the SR transmission prohibition timer is running.

On the other hand, in this embodiment, as illustrated in FIG. 6, in a case where the special SR is transmitted at a certain TTI, if an UL CCH is present in the TTI, the user equipment 10 may transmit the normal SR by using the UL CCH. For example, the base station 20, which receives the normal SR, may instruct the user equipment 10 to monitor the DL CCH #2 with the DL CCH #1 of the subsequent TTI, and may transmit UL grant with the DL CCH #2. In a case where the special SR is transmitted in a short time such as one symbol, it is effective to use the normal SR transmission in combination so as to sufficiently enhance reliability of user equipment identification.

Note that, the user equipment, which transmits the special SR at the leading portion of the grant free UL data resource region may not initiate the SR transmission prohibition timer.

With Respect to SR that is Transmitted with UL CCH

With regard to a transmission operation of the normal SR, description will be given of an operation example of the user equipment 10 with respect to the SR that is transmitted with the UL CCH with reference to FIG. 7. SR to be described below is SR having a function different from that of the normal SR. The SR may be the same SR as the special SR, or SR different from the special SR.

In this example, in a case where in a certain TTIn (n represents a TTI number, and is an integer of equal to or greater than 0 as an example), the grant free UL data resource region is configured in the user equipment 10, and the user equipment 10 has UL data, the user equipment 10 transmits SR with a UL CCH at any one TTI from TTIn-k (k is a natural number) to TTIn-1. In this example, "the user equipment 10 has UL data" represents a case where the user equipment 10 has the UL data at a point of time of transmitting SR, or a case where the user equipment 10 does not have the UL data at the point of time of transmitting SR but the UL data occurs by the TTIn. In addition, the user equipment 10 may perform the operation that is described here regardless of whether or not the user equipment 10 has the UL data.

The base station 20 can determine that grant free UL transmission occurs at the TTIn by receiving the SR from the user equipment 10, and can perform, for example, a control of not transmitting a monitoring instruction for the DL CCH #2 with the DL CCH #1 at the TTIn.

FIG. 7(a) is a view illustrating the above-described example in a case of k=1. As illustrated in FIG. 7(a), a grant free UL data resource region is configured in the user equipment 10 at the TTIn. For example, UL data occurs in the user equipment 10 at TTIn-1, but an UL transmission resource is not present at the TTIn-1. Accordingly, it is not possible to transmit the UL data at the TTIn-1. Here, the user equipment 10 transmits SR with an UL CCH of the TTIn-1, and transmits UL data by using the grant free UL data resource of the TTIn.

With regard to the grant free UL data resource of the TTIn, when not receiving SR from any user equipment from the TTIn-k to the TTIn-1, the base station 20 determines that the grant free UL data resource of the TTIn is not used, and can use the grant free UL data resource region for another usage. That is, in this case, for example, the base station 20 gives an instruction for the user equipment 10, which becomes a downlink data transmission target, to monitor the DL CCH #2 with the DL CCH #1, and transmits allocation information of a downlink resource to the user equipment 10 with the DL CCH #2. The user equipment 10 receives downlink data by using the resource.

Here, in a case where the user equipment 10 having the grant free UL data resource region at the TTIn does not transmit SR from the TTIn-k to the TTIn-1, even when the UL data is present, the user equipment 10 does not perform UL data transmission by using the grant free UL data resource of the TTIn.

However, even in a case where the user equipment 10 having the grant free UL data resource region at the TTIn does not transmit SR from the TTIn-k to the TTIn-1, when receiving control information, which indicates "grant free UL transmission is possible" from the base station 20 with the DL CCH #1 of the TTIn, the user equipment 10 can perform UL transmission at the grant free UL data resource.

In addition, the user equipment 10 may receive control information, which indicates availability of grant free UL transmission from the base station 20 with the DL CCH #1 of the TTIn regardless of whether or not the user equipment 10 transmits SR from the TTIn-k to the TTIn-1. In this case, in a case where the control information indicates "grant free UL transmission is possible", the user equipment 10 performs grant free UL transmission (in a case where UL data is present), and the user equipment 10 does not perform grant free UL transmission in a case where the control information indicates "grant free UL transmission is impossible". The control information of "grant free UL transmission is impossible" may be a DL CCH #2 monitoring instruction.

In a case of transmitting the control information indicating availability of the grant free UL transmission, for example, when receiving information (for example, a buffer state report), which indicates that UL data that is not transmitted at a point of time of TTIn is present, from any one user equipment among a plurality of user equipments having the grant free UL data resource region at the TTIn, at a point of time before the TTIn, the base station 20 transmits control information, which indicates "grant free UL transmission is possible", to each of the user equipments. In addition, in a case of not receiving the information, the base station 20 transmits control information (for example, a DL CCH #2 monitoring instruction) of "grant free UL transmission is impossible" to each user equipment so as to use the grant free UL data resource region for another use.

Figure 7:
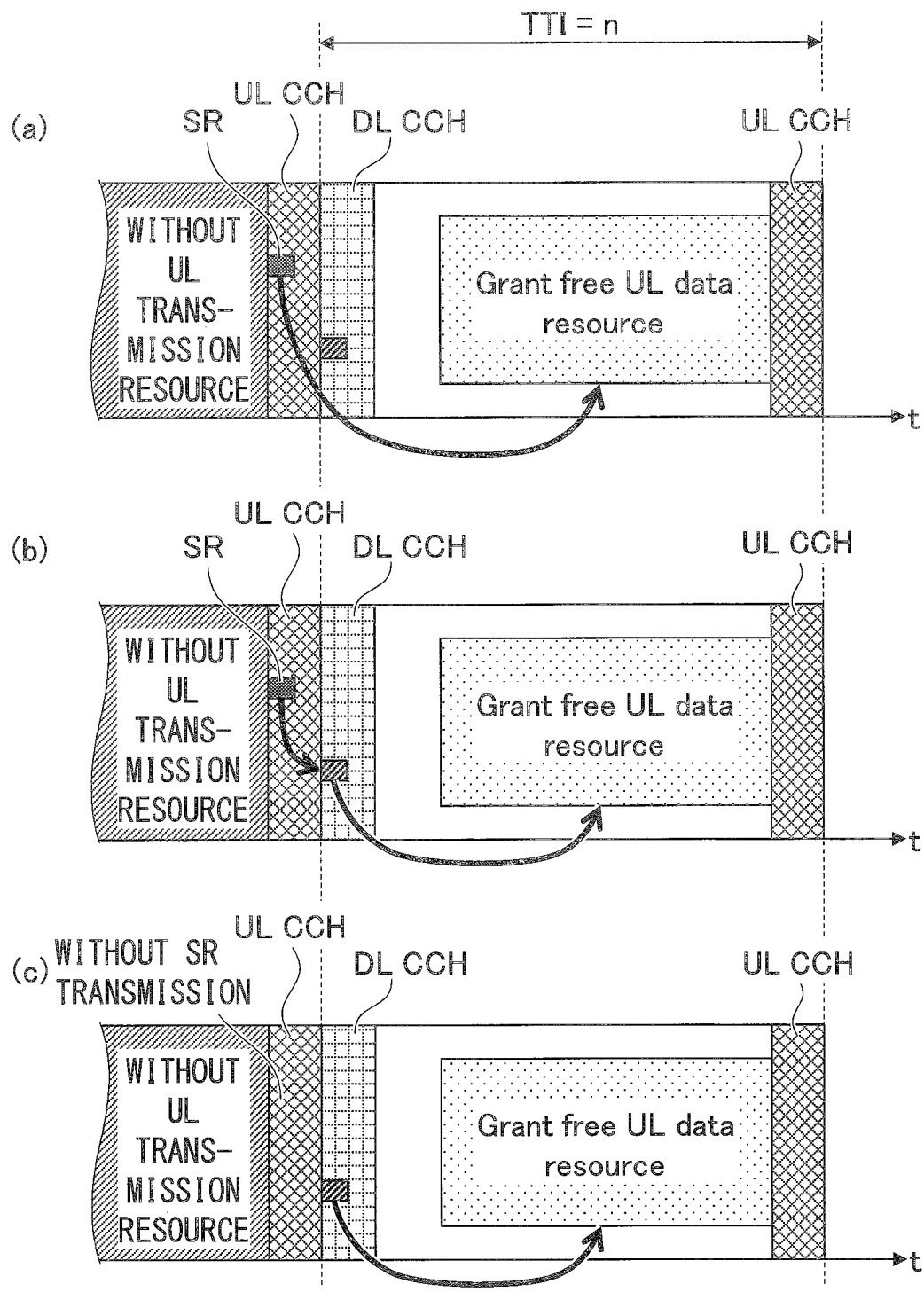
FIG. 7 is a view illustrating a detailed example of the SR transmission.

FIGS. 7(*b*) and 7(*c*) are views illustrating an example in a case where the user equipment 10 receives control information indicating availability of grant free UL transmission from the base station 20 with the DL CCH #1 at the TTIn.

In the example of FIG. 7(*b*), the user equipment 10 transmits SR with the UL CCH of the TTIn-1, receives control information indicating that grant free UL transmission is possible with the DL CCH #1 of the TTIn, and performs grant free UL transmission.

In the example of FIG. 7(*c*), the user equipment 10 does not transmit SR until reaching TTIn-1, but receives control information indicating that grant free UL transmission is possible with the DL CCH #1 of the TTIn and performs grant free UL transmission.

In addition, in a case where the grant free UL data resource region is configured at a certain TTIn, even when having UL data, the user equipment 10 may not transmit SR from the TTIn-k (k is a natural number) to the TTIn-1. Note that, for example, k is 1.

In this case, for example, as illustrated in FIGS. 5B and 5C, the user equipment 10 which has UL data (which performs UL data transmission with the grant free UL data resource) transmits the identification signal at a leading portion of the grant free UL data resource region so as to notify the base station 20 of the grant free UL transmission. According to this scheme in which SR is not transmitted, it is possible to reduce a signaling overhead of SR transmission.

With Respect to Configuration of Uplink Control Channel (UL CCH)

Next, a detailed example of configuration of the UL CCH will be described. As described above, in a grant free data transmission time unit (here, 1TTI), the UL CCH may be configured to the user equipment 10 or may not be configured thereto.

In a case where the UL CCH is configured, the user equipment 10 receives an instruction (control information) using the DL CCH from the base station 20 at a certain TTI, and can configure a transmission method and/or a transmission resource of the UL CCH on the basis of the instruction. For example, configuration of the UL CCH can be dynamically changed for each TTI.

Figure 8A:
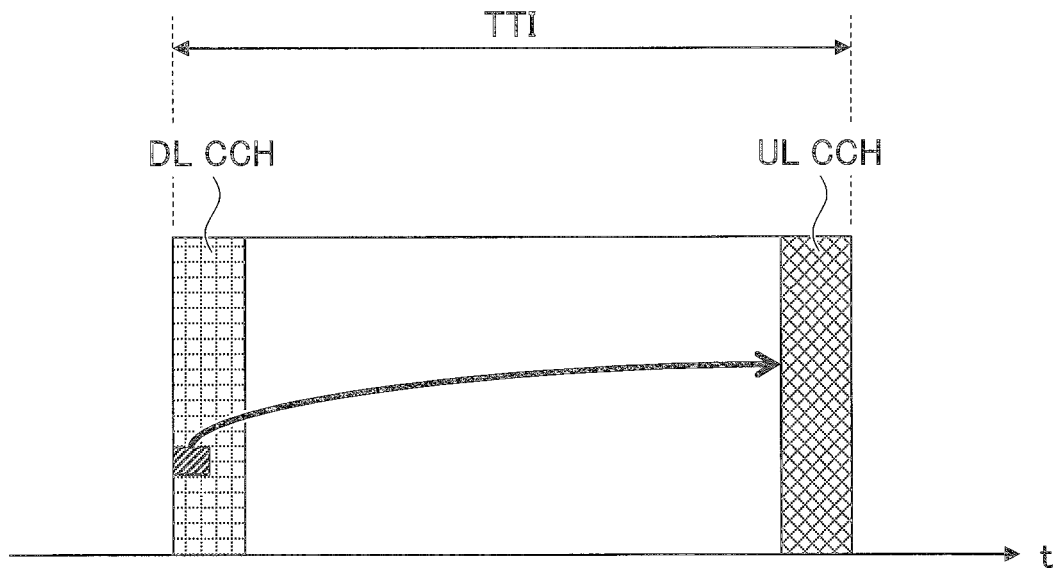
FIG. 8A is a view illustrating Setting Example 1 of an uplink control CH.
Figure 8B:
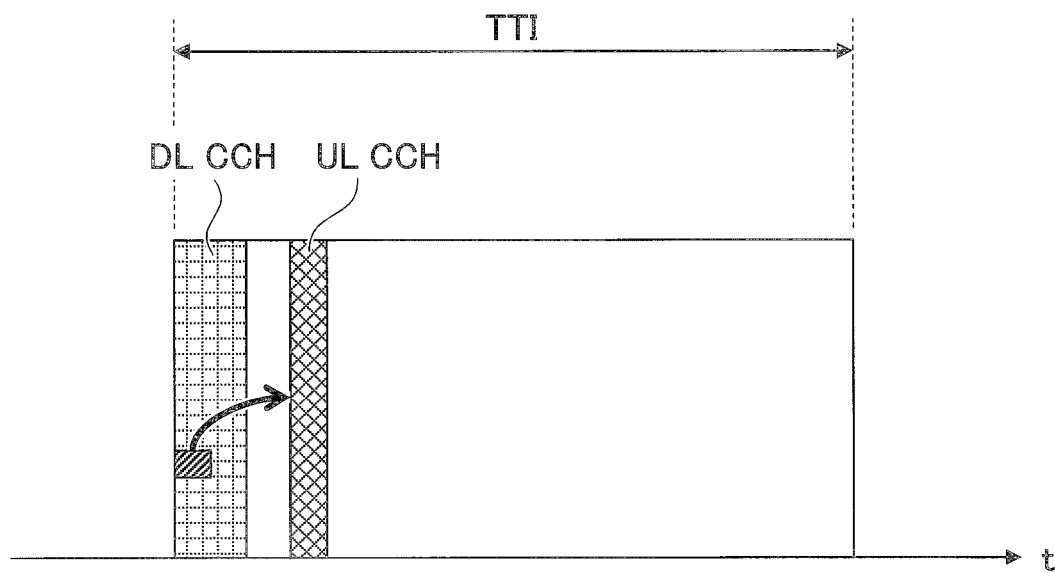
FIG. 8B is a view illustrating Setting Example 2 of the uplink control CH.

FIGS. 8A and 8B are views illustrating Configuration Examples 1 and 2 of the UL CCH. FIG. 8A illustrates an example in which the UL CCH is configured at a termination end of the TTI. In this manner, when the UL CCH is configured at the termination end of the TTI, for example, the user equipment 10 can transmit a HARQ feedback with respect to DL data reception in the TTI.

In addition, as illustrated in FIG. 8B, the UL CCH can be configured immediately after the DL CCH #1. In this case, for example, in a case where the grant free UL data resource region is allocated temporally after the UL CCH in the TTI, the user equipment 10 can perform grant free UL transmission after transmitting a signal (for example, the identification signal, the SR, and the like), which indicates that grant free UL transmission is performed, to the base station 20 by using the UL CCH. According to this, the base station 20 can perform detection of the grant free UL transmission and identification of the user equipment at a high speed.

Note that, the kinds of uplink control information that can be transmitted by the UL CCH can be limited in accordance with arrangement of the UL CCH. For example, as illustrated in FIG. 8B, in a case where the UL CCH is configured immediately after the DL CCH #1 (or before an uplink/downlink data channel), only the scheduling request (SR) and a CSI report (CQI, RI, PMI, and the like) may be transmitted with the UL CCH. In addition, for example, as illustrated in FIG. 8A, in a case where the UL CCH is disposed at the termination end of the TTI, only the HARQ feedback with respect to downlink data reception may be transmitted with the UL CCH.

By limiting the kinds of uplink control information that can be transmitted, it is possible to realize reduction of an overhead such as reduction of the number of symbols which are used in the UL CCH.

With Respect to Multi-Stage Grant Free UL Multiple Access

The grant free UL data resource region can be configured as multi stages. For example, the grant free UL data resource region illustrated in FIG. 3 and the like is set as a first grant free UL data resource region, and a grant free UL data resource region (referred to as "second grant free UL data resource region") in which initiation is later in comparison to the first grant free UL data resource region is configured through higher layer signaling from the base station 20, and the like.

For example, the user equipment 10 may make the second grant free UL data resource region valid on the basis of a notification from the base station 20 with the DL CCH #2, or may autonomously determine availability of UL transmission in the second resource region on the basis of presence or absence of UL transmission using a resource of the first grant free UL data resource region.

A detailed example will be described with reference to FIGS. 9A and 9B. Note that, a notation method in FIG. 9, FIG. 10, and FIG. 11 is the same as in FIG. 3.

Figure 9A:
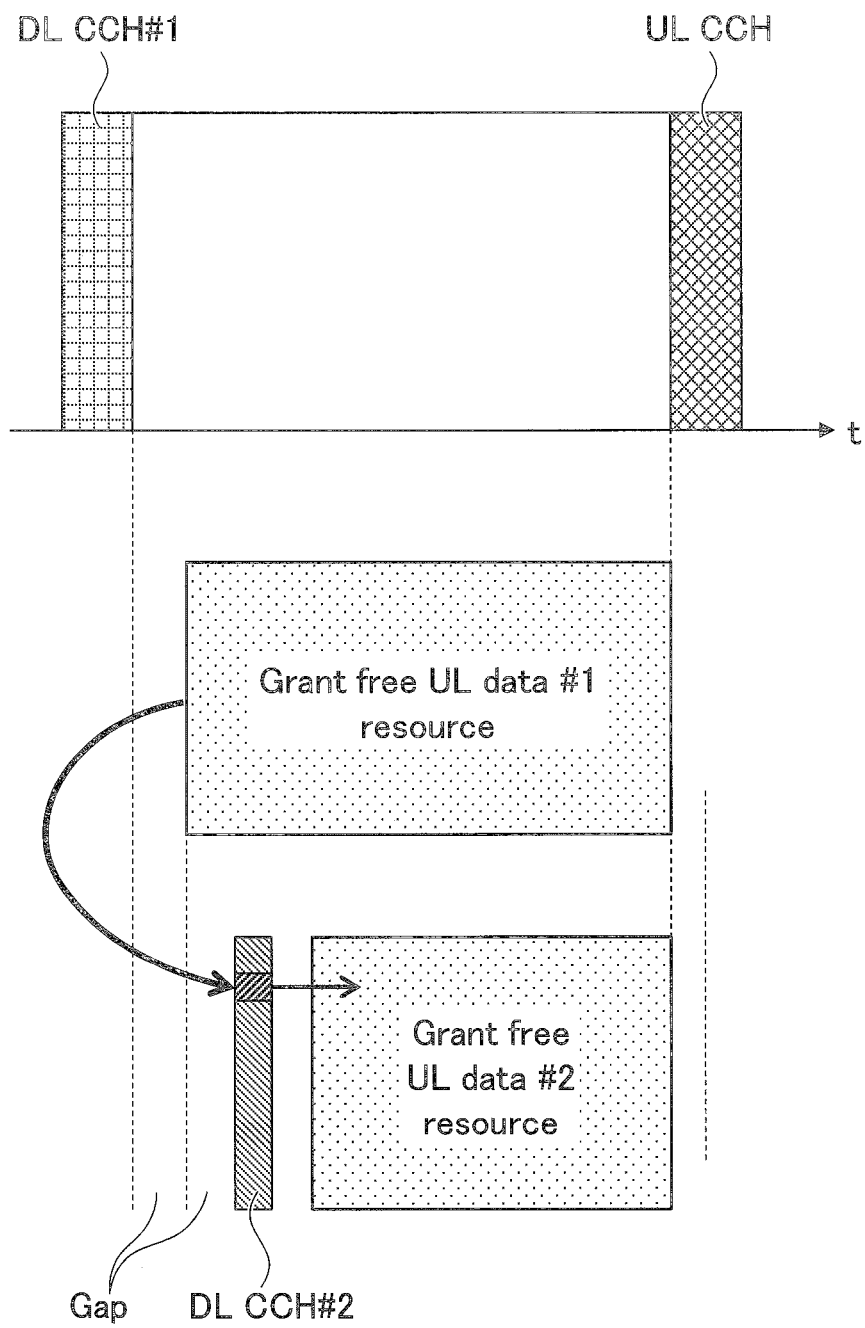
FIG. 9A is a view illustrating an example of multi-stage grant free UL multiple access, illustrating Example 1.
Figure 9B:
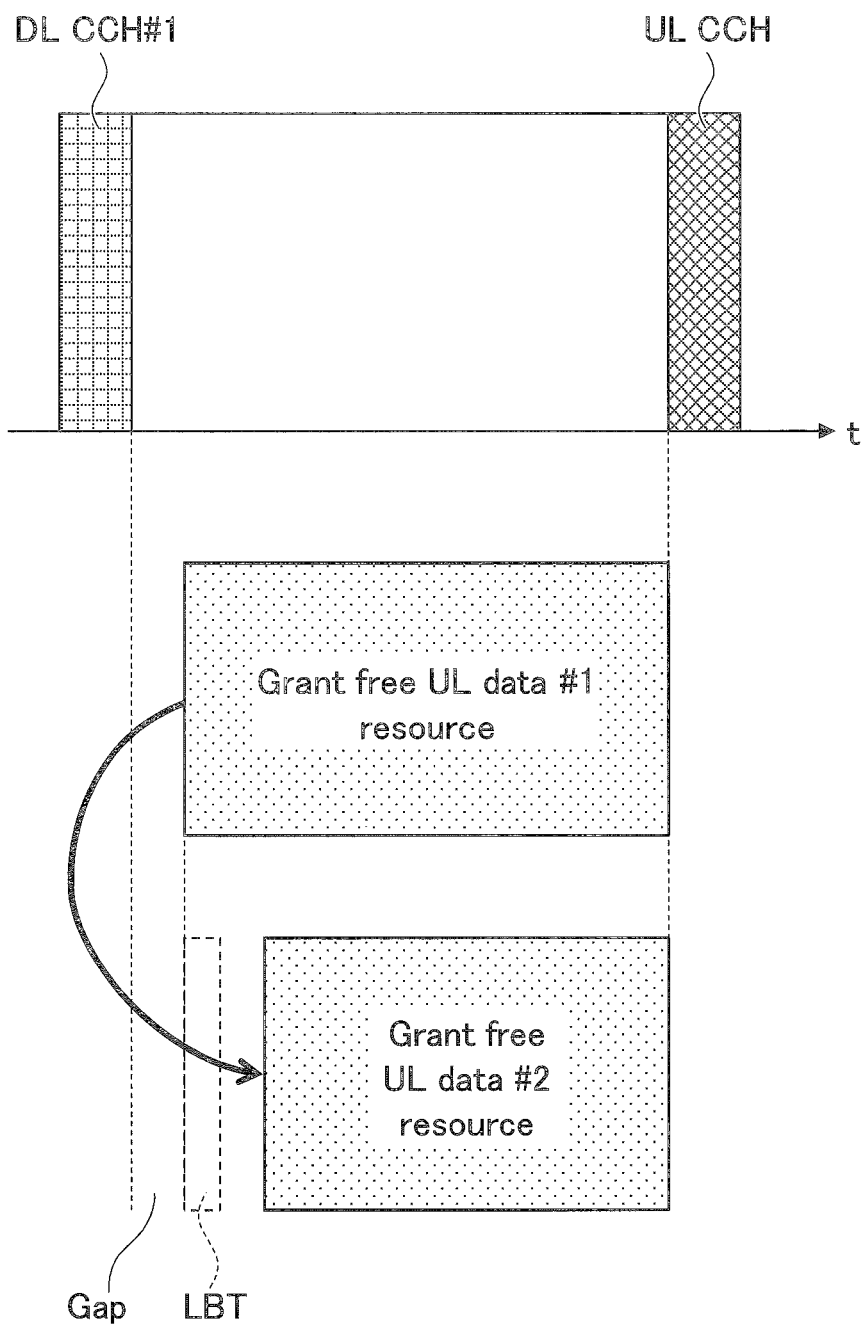
FIG. 9B is a view illustrating an example of multi-stage grant free UL multiple access, illustrating Example 2.

In an example of FIGS. 9A and 9B, a grant free UL data resource region #1 that corresponds to the first grant free UL data resource region, and a grant free UL data resource region #2 that corresponds to the second grant free UL data resource region are configured.

In Example 1 of FIG. 9A, when detecting that UL transmission in the grant free UL data resource region #1 is not present, the base station 20 transmits control information, which permits using of a resource of the grant free UL data resource region #2, to each user equipment by using the DL CCH #2. For example, the user equipment that receives the control information can transmit UL data, which unexpectedly occurs after the DL CCH #, by using a resource of the grant free UL data resource region #2.

In addition, in Example 2 of FIG. 9B, the user equipment 10 monitors a resource of the grant free UL data resource region #1 for a predetermined time indicated by listen-before-talk (LBT) from initiation of the grant free UL data resource region #1 instead of using the DL CCH #2 to confirm whether or not UL transmission from another user equipment using the resource is present, and performs UL transmission by using a resource of the grant free UL data resource region #2 in a case where UL transmission from the other user equipment is not present.

As described above, the method in which multi-stage grant free UL data resource region is provided is effective for a case where required conditions such as priority and/or target error rate are different between user equipments which are grant free UL transmission targets.

FIGS. 9A and 9B illustrate a configuration of two-stage grant free UL data resource region as an example. Three-stage configuration as illustrated in FIGS. 10A and 10B is also possible, and the number of stages may be greater than three. By increasing the number of stages, a more flexible control is possible.

Figure 11A:
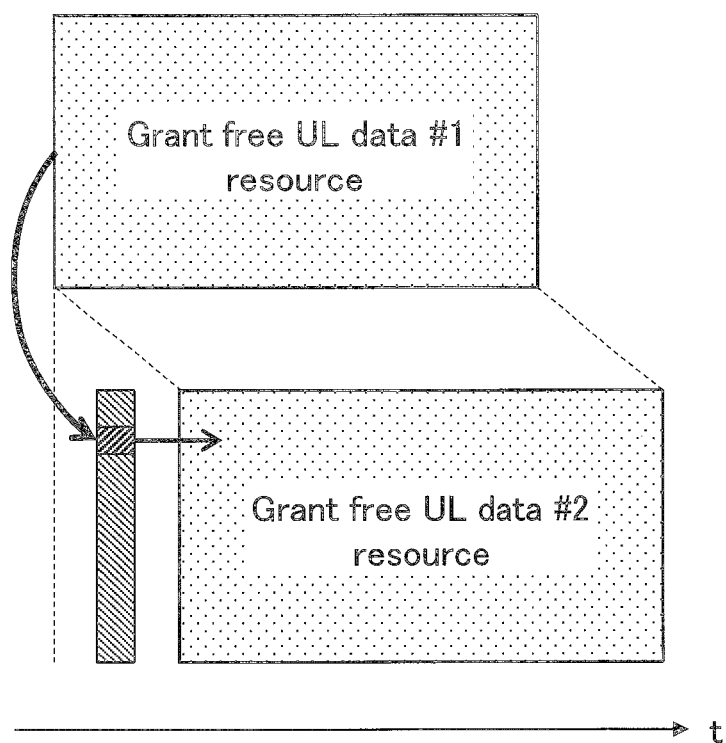
FIG. 11A is a view illustrating an example of grant free UL multiple access in which time shift is performed, illustrating Example 1.
Figure 11B:
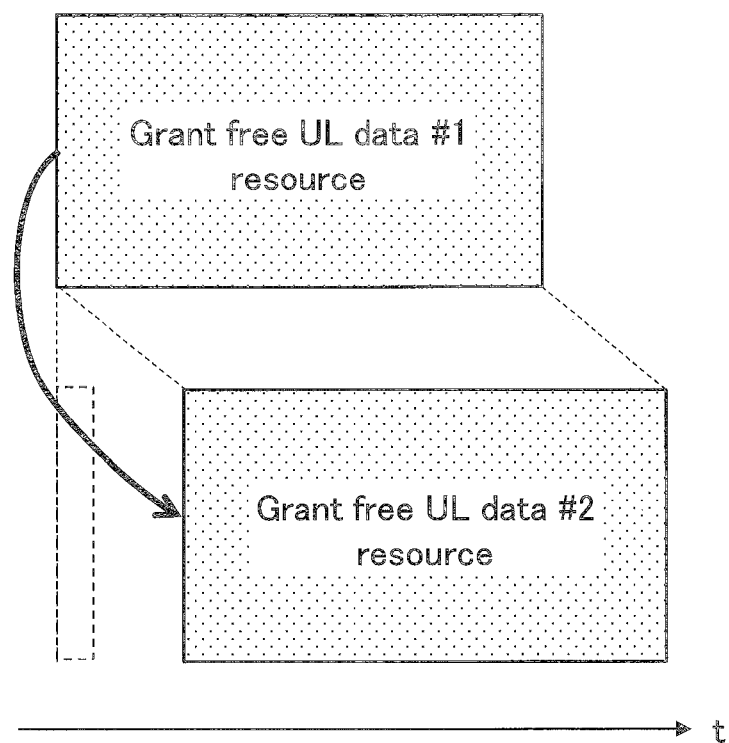
FIG. 11B is a view illustrating an example of grant free UL multiple access in which time shift is performed, illustrating Example 2.

In addition, a time width of respective grant free UL data resource regions, which constitute the multi-stage grant free UL data resource region, may be common. In this case, as illustrated in FIGS. 11A and 11B, a time position of a grant free UL data resource region of a rear stage is shifted. When the time width of the respective grant free UL data resource regions are made to be common (the same), it is possible to suppress complexity of the user equipment.

Device Configuration

Description will now be given to a functional configuration example of the user equipment 10 and the base station 20 which execute the operation in the embodiment as described above.

User Equipment

Figure 12:
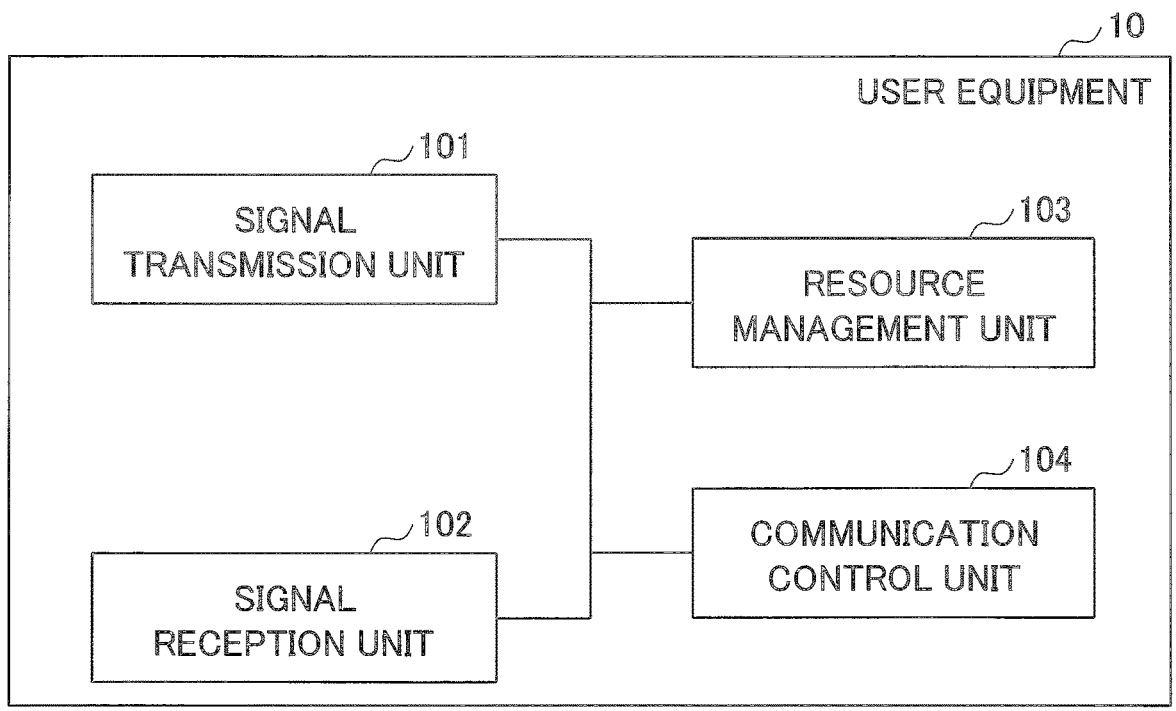
FIG. 12 is a view illustrating an example of a functional configuration of a user equipment 10.

FIG. 12 is a view illustrating an example of a functional configuration of the user equipment 10 according to the embodiment. As illustrated in FIG. 12, the user equipment 10 includes a signal transmission unit 101, a signal reception unit 102, a resource management unit 103, and a communication control unit 104. The functional configuration illustrated in FIG. 12 is illustrative only. A functional classification or the name of the functional units may be arbitrarily set as long as the operation according to the embodiment can be executed.

The signal transmission unit 101 creates a transmission signal, and wirelessly transmits the signal. The signal reception unit 102 includes a function of wirelessly receiving various signals and acquiring a signal of a further higher layer from a signal of a physical layer which is received.

The resource management unit 103 retains resource information included in control information that is received from the base station 20 by the signal reception unit 102, resource information that is instructed through higher layer signaling, resource information that is configured in advance, resource information that is determined by the user equipment 10, various pieces of configuration information, and the like.

The signal transmission unit 101 performs the UL transmission operation and the like as described above on the basis of the information that is retained in the resource management unit 103. In addition, the signal reception unit 102 performs reception of control information, reception of higher layer signaling, reception of a broadcast signal, reception of DL data, and the like on the basis of the information that is retained in the resource management unit 103. Furthermore, "configuration information" may include configuration information of the grant free UL data resource region.

For example, the communication control unit 104 executes a control operation of determining whether or not the user equipment 10 performs the multi-stage grant free UL multiple access, and the like.

Base Station 20

Figure 13:
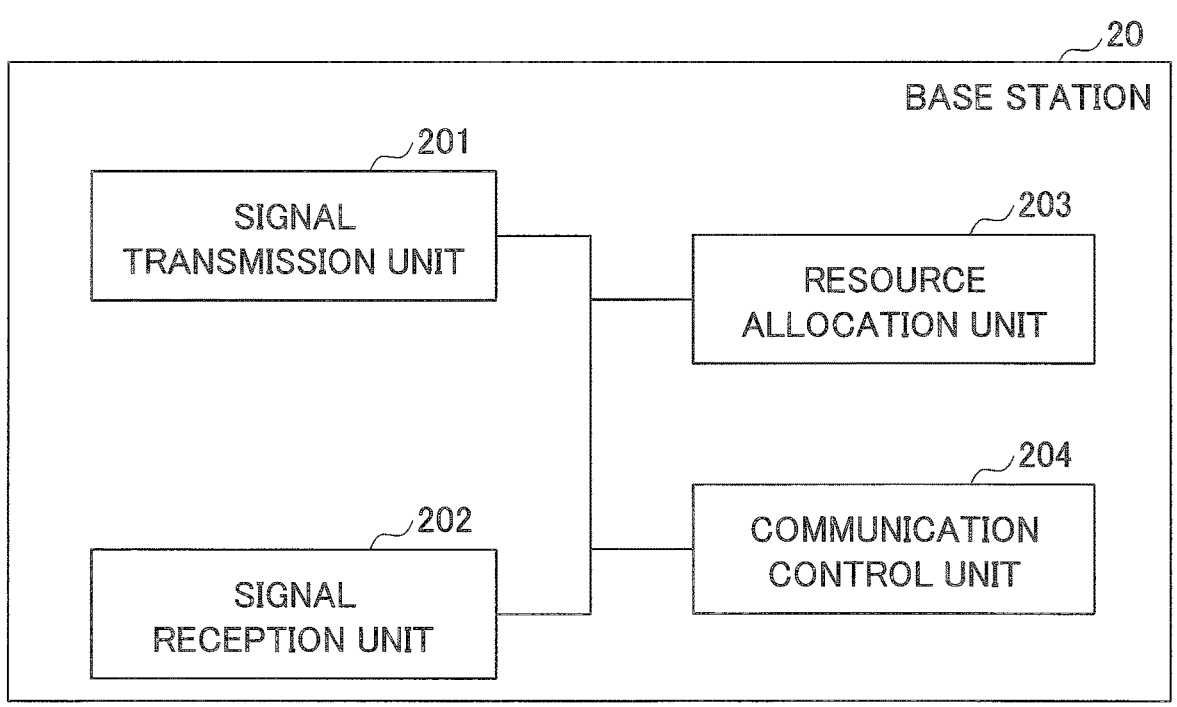
FIG. 13 is a view illustrating an example of a functional configuration of a base station 20.

FIG. 13 is a view illustrating an example of a functional configuration of the base station 20 according to this embodiment. As illustrated in FIG. 13, the base station 20 includes a signal transmission unit 201, a signal reception unit 202, a resource allocation unit 203, and a communication control unit 204. The functional configuration illustrated in FIG. 13 is illustrative only. A functional classification or the name of the functional units may be arbitrarily set as long as the operation according to the embodiment can be executed.

The signal transmission unit 201 includes a function of generating a signal to be transmitted to a user equipment 10 side, and wirelessly transmitting the signal. The signal reception unit 202 includes a function of receiving various signals which are transmitted from the user equipment 10, and acquiring information of, for example, a further higher layer from the signal that is received. In addition, the signal reception unit 202 receives SR and/or identification information which are transmitted from the user equipment 10.

The resource allocation unit 203 performs creation of control information that is transmitted with the DL CCHs #1 and #2, and the like. The information that is created is transmitted from the signal transmission unit 201. For example, when not receiving a signal, which indicates that grant free UL transmission is performed, from any user equipment through signal monitoring with the signal reception unit 202, the resource allocation unit 203 creates control information to be transmitted with the DL CCH #2, and transmits the control information to a user equipment that is a scheduling target through the signal transmission unit 201. For example, the communication control unit 204 performs creation of configuration information that is transmitted through higher layer signaling, creation of configuration information that is transmitted by a broadcast signal, and the like. The information that is created is transmitted from the signal transmission unit 201.

Hardware Configuration

The block diagrams (FIG. 12 and FIG. 13) which are used in description of the embodiment illustrate blocks of a function unit. The function blocks (constituent units) are realized by an arbitrary combination of hardware and/or software. In addition, means for realizing respective function blocks is not particularly limited. That is, the respectively function block may be realized by one device in which a plurality of elements are physically and/or logically combined. In addition, two or greater devices, which are physically and/or logically separated from each other, may be directly and/or indirectly (for example, wire and/or wirelessly) connected, and the respective function blocks may be realized by a plurality of the devices.

Figure 14:
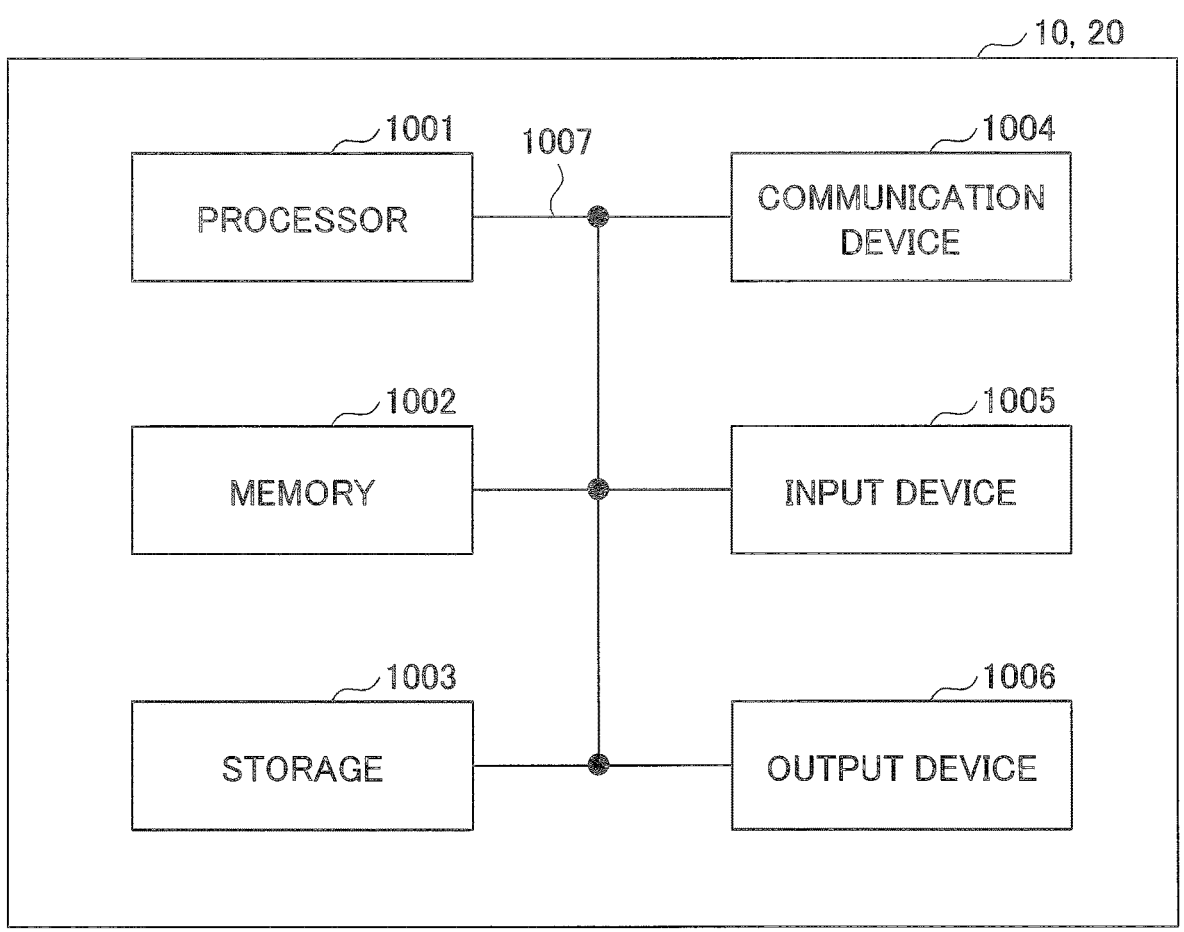
FIG. 14 is a view illustrating an example of a hardware configuration of the user equipment 10 and the base station 20.

For example, the user equipment 10 and the base station 20 in the embodiment of the invention may function as a computer that performs processing according to the embodiment. FIG. 14 is a view illustrating an example of a hardware configuration of the user equipment 10 and the base station 20 according to this embodiment. The user equipment 10 and the base station 20 may be configured as a computer device that physically includes a processor 1001, a memory 1002, a storage 1003, a communication device 1004, an input device 1005, an output device 1006, a bus 1007, and the like.

Furthermore, in the following description, a term "device" may be substituted with a circuit, a device, a unit, and the like. The hardware configuration of the user equipment 10 and the base station 20 may include the respective devices, which are indicated by reference numerals 1001 to 1006 in the drawing, one by one or in a plural number, or may not include a part of the devices.

Respective functions in the user equipment 10 and the base station 20 are realized by reading out predetermined software (program) from hardware such as the processor 1001 and the memory 1002 so as to allow the processor 1001 to perform an arithmetic operation, and by controlling a communication by the communication device 1004, and reading-out and/or input of data in the memory 1002 and the storage 1003.

For example, the processor 1001 allows an operating system to operate so as to control the entirety of the computer. The processor 1001 may be constituted by a central processing unit (CPU) that includes an interface with a peripheral device, a control device, an arithmetic operation device, a register, and the like.

In addition, the processor 1001 reads out a program (program code), a software module, or data from the storage 1003 and/or the communication device 1004 into the memory 1002, and performs various kinds of processing according to the program, the software module, or the data. As the program, a program, which allows the computer to execute at least a part of the operations described in the embodiment, is used. For example, the signal transmission unit 101, the signal reception unit 102, the resource management unit 103, and the communication control unit 104 of the user equipment 10 may be realized by a control program that is stored in the memory 1002 and is operated by the processor 1001. In addition, the signal transmission unit 201, the signal reception unit 202, the resource allocation unit 203, and the communication control unit 204 of the base station 20 may be realized by a control program that is stored in the memory 1002 and is operated by the processor 1001. The above-described various kinds of processing are described to be executed by one processor 1001, but may be simultaneously or sequentially executed by two or greater processors 1001. The processor 1001 may be mounted by one or greater chips. Furthermore, the program may be transmitted from a network through electric communication line.

The memory 1002 is a computer-readable recording medium, and may be constituted by, for example, at least one of a read only memory (ROM), an erasable programmable ROM (EPROM), an electrically erasable programmable ROM (EEPROM), a random access memory (RAM), and the like. The memory 1002 may be referred to as a register, a cache, a main memory (main storage device), and the like. The memory 1002 can retain a program (program code), a software module, and the like which can be executed to carry out processing the embodiment of the invention.

The storage 1003 is a computer-readable recording medium, and may be constituted by at least one, for example, among an optical disc such as a compact disc ROM (CD-ROM), a hard disk drive, a flexible disk, a magneto-optical disc (for example, a compact disc, a digital multi-purpose disc, and a Blue-ray (registered trademark) disc), a smart card, a flash memory (for example, a card, a stick, a key drive), a floppy (registered trademark) disk, a magnetic strip, and the like. The storage 1003 may be referred to as an auxiliary storage device. For example, the above-described storage medium may be database including the memory 1002 and/or the storage 1003, a server, and other appropriate media.

The communication device 1004 is hardware (transmission and reception device) that performs a communication between computers through wire and/or radio network, and may be referred to as, for example, a network device, a network controller, a network card, a communication module, and the like. For example, the signal transmission unit 101 and the signal reception unit 102 of the user equipment 10 may be realized by the communication device 1004. In addition, the signal transmission unit 201 and the signal reception unit 202 of the base station 20 may be realized by the communication device 1004.

The input device 1005 is an input device (for example, a keyboard, a mouse, a microphone, a switch, a button, a sensor, and the like) that receives an input from the outside. The output device 1006 is an output device (for example, a display, a speaker, an LED lamp, and the like) that performs output to the outside. Furthermore, the input device 1005 and the output device 1006 may have an integral configuration (for example, a touch panel).

In addition, respective devices including the processor 1001, the memory 1002, and the like are connected to each other through a bus 1007 for an information communication. The bus 1007 may be configured as a single bus, or may be configured as a bus that is different between devices.

In addition, the user equipment 10 and the base station 20 may include hardware such as a microprocessor, a digital signal processor (DSP), an application specific integrated circuit (ASIC), a programmable logic device (PLD), and a field programmable gate array (FPGA), or a part or the entirety of respective function blocks may be realized by the hardware. For example, the processor 1001 may be mounted by least one piece of hardware.

Summary of Embodiment

As described above, according to the embodiment, there is provided a user equipment in a radio communication system including a base station and the user equipment. The user equipment include: a resource management unit that retains configuration information of a resource capable of transmitting uplink data without receiving uplink data transmission permission from the base station; and a transmission unit that transmits a signal indicating that uplink data transmission using the resource is performed to the base station.

According to the configuration, it is possible to suppress deterioration of resource utilization efficiency in a radio communication system in which a resource capable of transmitting uplink data without receiving uplink data transmission permission is configured.

The transmission unit may transmit the signal with an uplink control channel before a leading portion in a time region of the resource, or the transmission unit may transmit the signal at the leading portion in the time region of the resource. According to this configuration, it is possible to rapidly notify a base station of a signal indicating that uplink data transmission is performed.

The user equipment may further include a reception unit that receives control information that is transmitted by using a downlink control channel from the base station in a case where the uplink data transmission using the resource is not performed. The downlink control channel may be set after a predetermined gap in which the leading portion in the time region of the resource is set as a leading portion. According to this configuration, for example, in a case where data transmission using a resource capable of transmitting uplink data without receiving uplink data transmission permission is not performed, the user equipment can perform an operation corresponding to an instruction from the base station.

For example, the control information may be information indicating use permission of a resource capable of performing uplink data transmission without getting uplink data transmission permission that is set after the resource, information indicating a resource that is allocated for uplink data transmission, or information indicating a resource that is allocated for downlink data reception. According to this configuration, for example, the user equipment can perform data transmission based on the uplink data transmission permission, can perform data reception based on the downlink data transmission permission, or can perform uplink data transmission that suddenly occurs without getting the uplink data transmission permission.

Supplement of Embodiment

Information notification may be performed other methods without limitation to the aspect and the embodiment which are described in this specification. For example, the information notification may be executed by physical layer signaling (for example, downlink control information (DCI) and uplink control information (UCI)), higher layer signaling (for example, RRC signaling, MAC signaling, broadcast information (master information block (MIB), system information block (SIB))), other signals, or a combination thereof. In addition, the RRC message may be referred to as RRC signaling. In addition, for example, the RRC message may be an RRC connection setup message, an RRC connection reconfiguration message, and the like.

The aspect and the embodiment which are described in this specification may also be applied to long term evolution (LTE), LTE-Advanced (LTE-A), SUPER 3G, IMT-Advanced, 4G, 5G, future radio access (FRA), W-CDMA (registered trademark), GSM (registered trademark), CDMA2000, ultra mobile broadband (UMB), IEEE 802.11 (Wi-Fi), IEEE 802.16 (WiMAX), IEEE 802.20, ultra-wideband (UWB), Bluetooth (registered trademark), other systems which use a suitable system, and/or a next generation system that is extended on the basis of the systems.

Information that is input or output, and the like may be stored in a specific location (for example, a memory), or may be managed by a management table. The information that is input or output, and the like may be subjected to rewriting, updating, or additional writing. The information, which is output, and the like may be deleted. The information, which is input, and the like may be transmitted to other devices.

Decision or determination may be performed by a value (0 or 1) that is expressed by one bit, may be performed in accordance with Boolean (true or false), or may be performed through numerical value comparison (for example, comparison with a predetermined value).

The information, the signals, and the like, which are described in this specification, may be expressed by using any one of other various technologies. For example, data, information, a signal, a bit, a symbol, and the like, which are stated over the entirety of the above description, may be expressed by a voltage, a current, an electromagnetic wave, a magnetic field or a magnetic particle, a photo field or a photon, or an arbitrary combination thereof.

Furthermore, terms described in this specification and/or terms necessary for understanding of this specification may be substituted with terms having the same or similar meaning. For example, the channel and/or the symbol may be a signal. In addition, the signal may be a message.

The user equipment may be referred to as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or several other suitable terms by those skilled in the art.

In the procedure, the sequence, and the like in the aspect and the embodiment which are described in this specification, the order thereof may be changed as long as inconsistency does not occur. For example, with regard to the method that is described in this specification, elements of various steps are suggested in an exemplary order, and there is no limitation to the specific order that is suggested.

The aspect and the embodiment which are described in this specification may be used alone or in combination thereof, or may be switched and used in accordance with execution. In addition, notification of predetermined information (for example, notification of "a fact of X") is not limited to the explicit notification, and may be performed in an implicit manner (for example, notification of the predetermined information is not performed).

The term "determining" that is used in this specification may include various operations. For example, the term "determining" may include regarding of calculating, computing, processing, deriving, investigating, looking up (for example, looking up in a table, a database, or other data structures), or ascertaining as "determined", and the like. In addition, the "determining" may include regarding of receiving (for example, information receiving), transmitting (for example, information transmitting), input, output, or accessing (for example, accessing to data in a memory) as "determined", and the like. In addition, "determining" may include regarding of resolving, selecting, choosing, establishing, comparing, or the like as "determining". That is, "determining" includes regarding of any operation as "determined".

Description of "on the basis of" in this specification does not represent "only on the basis of" unless otherwise stated. In other words, description of "on the basis of" represents both "only on the basis of" and "at least on the basis of".

The radio frame may be constituted by one or a plurality of frames in a time region. The one or the plurality of frames in the time region may be referred to as a subframe. In addition, the subframe may be constituted by one or a plurality of slots in the time region. In addition, the slot may be constituted by one or a plurality of symbols (OFDM symbol, SC-FDMA symbol, and the like) in the time region.

The entirety of the radio frame, the subframe, the slot, and the symbol represent a time unit when transmitting a signal. The radio frame, the subframe, the slot, and the symbol may be separate names corresponding to thereto.

For example, in an LTE system, the base station performs scheduling of allocating a radio resource (a frequency bandwidth capable of being used in each mobile station, transmission power, and the like) to the mobile station. A minimum time unit of the scheduling may be referred to as a transmission time interval (TTI).

For example, one subframe may be referred to as the TTI, a plurality of continuous subframes may be referred to as the TTI, or one slot may be referred to as the TTI. In addition, other time units may be referred to as the TTI.

The resource block (RB) is a resource allocation unit of the time region and the frequency region, and may include one or a plurality of continuous sub-carriers in the frequency region. In addition, the time region of the resource block may include one or a plurality of symbols, and may have a length of one slot, one subframe, or 1TTI. The 1TTI and the one subframe may be respectively constructed by one or a plurality of resource blocks. The above-described radio frame structure is illustrative only, and the number of subframes included in the radio frame, the number of slots included in a subframe, the number of symbols and resource blocks which are included in a slot, and the number of sub-carriers included in a resource block may be changed in various manners.

Hereinbefore, the invention has been described in detail, but it is apparent by those skilled in the art that the invention is not limited to the above-described embodiment in this specification. The invention can be executed a variation aspect and a modification aspect without departing from the gist or the scope of the invention which is determined by description of the appended claims. Accordingly, description in this specification is made for exemplary explanation, and does not have any limiting meaning with respect to the invention.

This patent application claims the benefit of Japanese Priority Patent Application JP 2016-158265 filed Aug. 10, 2016, and the entire contents of the Patent Application JP 2016-158265 are incorporated herein by reference.

EXPLANATIONS OF LETTERS OR NUMERALS

10 User equipment
20 Base station
101 Signal transmission unit
102 Signal reception unit
103 Resource management unit
104 Communication control unit
201 Signal transmission unit
202 Signal reception unit
203 Resource allocation unit
204 Communication control unit
1001 Processor
1002 Memory
1003 Storage
1004 Communication device
1005 Input device
1006 Output device

The invention claimed is:

1. A terminal comprising:
a receiver that receives first configuration information of a first resource for grant free uplink transmission in a bandwidth part from a base station by RRC signaling, and receives downlink control information (DCI), that activates the first resource, by a physical downlink control channel (PDCCH) from the base station; and
a transmitter that performs uplink transmission using the first resource when the receiver detects that uplink transmission from a second terminal that has received second configuration information of a second resource for grant free uplink transmission is not present,
wherein the first configuration information is different from the second configuration information, and
wherein the first configuration information for the bandwidth part received by the RRC signaling includes information on the PDCCH.

2. The terminal as claimed in claim 1, wherein the receiver detects whether the uplink transmission from the second terminal is not present by LBT (listen-before-talk).

3. A transmission method performed by a terminal comprising:
receiving first configuration information of a first resource for grant free uplink transmission in a bandwidth part from a base station by RRC signaling;
receiving downlink control information (DCI), that activates the first resource, by a physical downlink control channel (PDCCH) from the base station; and
performing uplink transmission using the first resource when detecting that uplink transmission from a second terminal that has received second configuration information of a second resource for grant free uplink transmission is not present,
wherein the first configuration information is different from the second configuration information, and
wherein the first configuration information for the bandwidth part received by the RRC signaling includes information on the PDCCH.

* * * * *